Patented May 27, 1924.

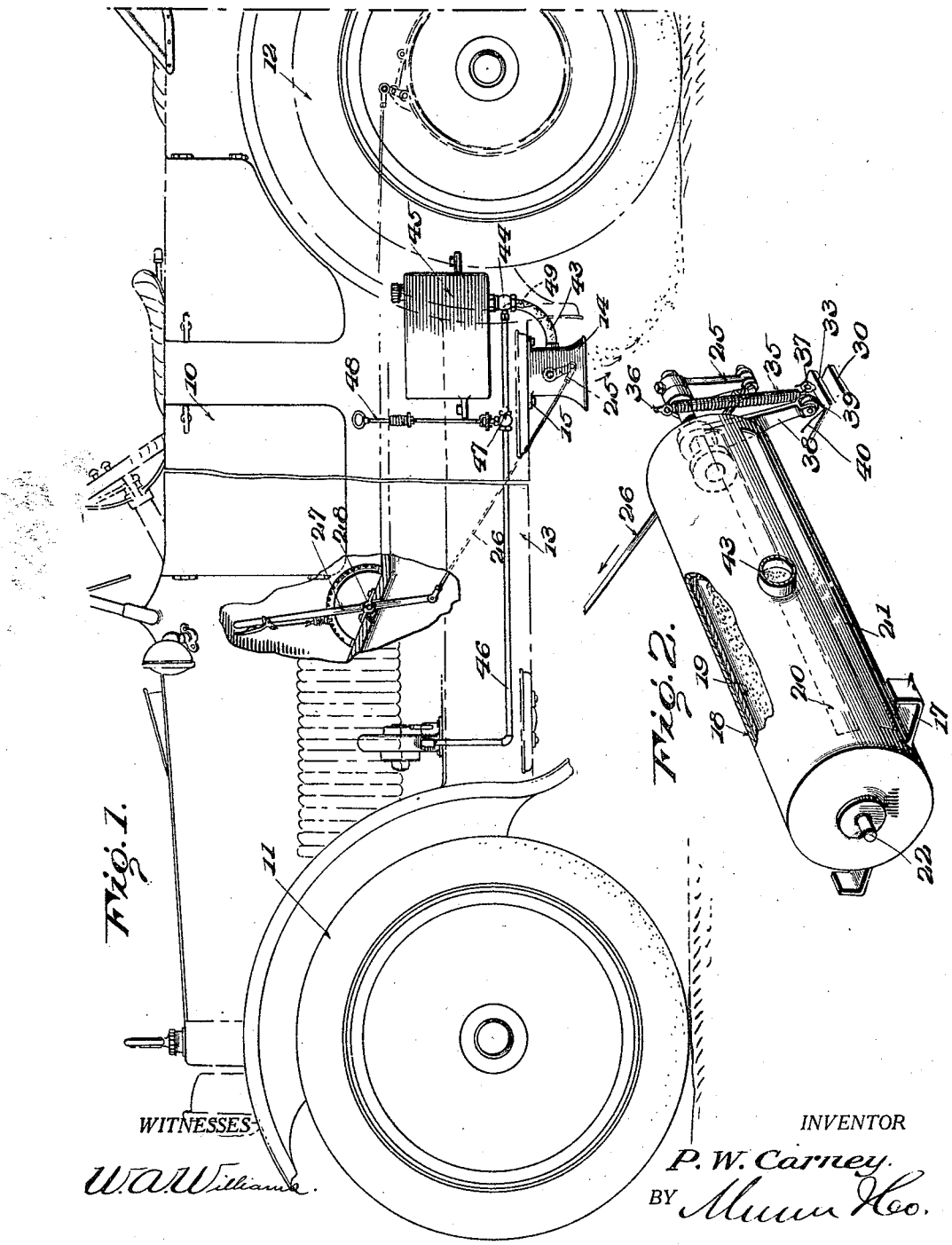

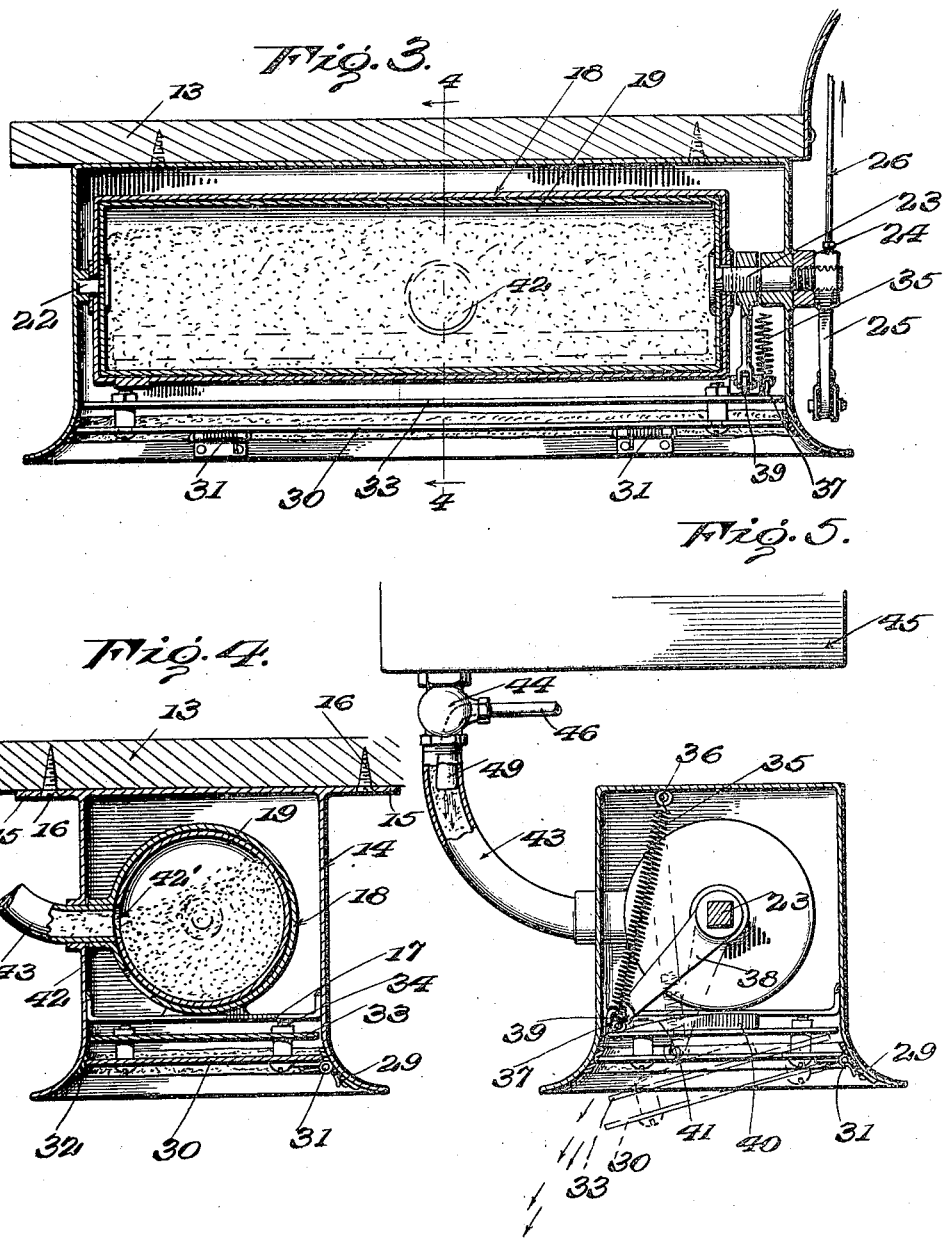

1,495,381

UNITED STATES PATENT OFFICE.

PERLEY WISE CARNEY, OF NORFOLK, VIRGNIA.

DISTRIBUTING APPARATUS.

Application filed July 6, 1923. Serial No. 649,919.

*To all whom it may concern:*

Be it known that I, PERLEY W. CARNEY, a citizen of the United States, residing at Norfolk, in the county of Norfolk, State of Virginia, have invented certain new and useful Improvements in Distributing Apparatus, of which the following is a specification.

This invention relates to an attachment for motor vehicles.

The invention more particularly relates to a distributing apparatus for motor vehicles whereby finely divided or pulverized material, such as sand or other surface friction material, may be scattered or distributed before one or both of the drive wheels of a motor vehicle, and thus overcome the possibility of these wheels skidding when passing over icy or wet and slippery roads.

A further object of the invention is that the apparatus be adapted to distribute or scatter the surface frictional material immediately before a drive wheel and to cover a surface of a greater width than the tread of the drive wheel, and thereby to avoid side skidding of the drive wheel.

A still further object of the invention is that the apparatus be adapted to operate in a positive and certain manner and also be adapted to permit a variable feeding of surface friction material upon the roadway and thus insure against any emergency which may be met to prevent skidding of the drive wheel.

Other objects, and objects relating to details of construction, combination and arrangement of parts will hereinafter appear in the detailed description to follow.

The invention is illustrated by way of example in the accompanying drawings, in which:—

Figure 1 is a view in side elevation of a motor vehicle showing the invention applied and also showing parts broken away and in section in order to more clearly illustrate the application of the invention, Figure 2 is a detail perspective view of the distributing drums together with associated parts thereof, Figure 3 is a longitudinal vertical sectional view of the distributing drums together with the associated hood therefor and also showing the manner in which the hood together with the drums may be secured to the running board of a motor vehicle, Figure 4 is a transverse sectional view taken substantially on the lines 4—4 of Figure 3, and Figure 5 is a view similar to Figure 4 but taken adjacent the one end of the hood and also showing the storage box or tank together with the connecting means between this storage tank and distributing drum.

Referring to the drawings, and more particularly Figure 1, 10 indicates generally the body of the vehicle which is supported by the front wheels 11 and the rear or drive wheels 12. At 13 there is indicated the running board of a motor vehicle, and this running board as seen occurs upon the left hand side of the body 10.

In carrying out the invention there is provided what may be termed a hood, generally indicated by the reference character 14, said hood being elongated as shown and formed upon each side with a plurality of tangs or extensions 15, whereby the same may be secured to the bottom of the running board 13 through the means of screws or the like, as indicated at 16. The hood is positioned to extend transversely of the running board, and disposed immediately forward to the associated drive wheel 12. Between the side walls of the hood 14 there is extended a supporting strap 17 which carries or supports the one end of a drum 18. The drum 18 extends substantially the length of the hood 14 and within this drum there is positioned a second drum 19, said drum being turnably fitted within the drum 18, and having an elongated slot 20 which is adapted to be brought into register with a similar slot 21 formed in the outer or stationary drum 18. The one end of the drum 19 carries a trunnion 22 which is suitably journaled in the associated end of the outer drum 18. The other end of the inner drum 19 carries a stub shaft 23 which is preferably square in cross section and which passes through the associated end wall of the outer drum 18, and at this point is adapted for free turning movement with relation to the last-named drum. The stub shaft 23 also extends through the associated end wall of the hood 14. The free end of the stub shaft 23 is threaded and carries a nut 24, whereby to hold the same against longitudinal movement. Also this free end carries a lever arm 25 which has its free end secured to the one end of a cable 26, said cable having its other end secured to a lever bar 27 which is fulcrumed, as at 28, for swinging movement and adapted to be operated by the driver of the motor vehicle. Also the lever 27 may have associated therewith a suitable pawl and ratchet arrangement as shown, whereby the same may be adjustably held against movement. The hood 14 has its lower and free edge formed with an outwardly curved lip 29, and within this outwardly curved portion of the hood there is positioned a door 30, said door being hinged, as at 31, to the hood. The hinges 31 are preferably spring hinges and adapted to yieldably hold the door in its closed position, as shown. Also the door may carry a suitable ceiling strip, as at 32, whereby to seal the open end of the hood. The door 30 further carries an auxiliary door or closure plate 33, said last-named door being supported in spaced relation to the door 30 by means of bolts 34 and adapted to fit within the walls of the hood 14. The doors 30 and 33 are arranged in this manner in order to form an extremely tight and water-proof closure for the hood 14. The lip 29 is for the purpose of preventing rain or water entering the hood and also for preventing ice from forming about the edges of the door 30 and causing inconvenience in opening this door. The door 30 and also the door 33 are further held in closed position by a coil spring 35 which has its one end secured to the top wall of the hood 14, as at 36, and its other end secured to the innermost door 33, as shown at 37.

The stub shaft 23 also carries an arm 38, said arm extending rigidly from the head or turnable therewith. This arm carries at its free end a roller 39 and this roller is adapted to engage with the outer surface of a block 40 carried by the inner door or closure 17, said block 40 having its upper face inclined, as shown at 41, and thereby to facilitate the movement of the roller 39 upon the surface of the block in opening the door in a gradual manner.

The outer drum 18 is further provided with a nipple 42, and the inner drum 19 is provided with an opening 42'. The nipple 42 has extended therein the one end of a supply pipe 42, said supply pipe terminating at its outer end in a T fitting 44 which communicates with the interior of the storage tank or box 45 and also with a pipe 46. The pipe 46 may be extended to one of the cylinders of the engine carried by the motor vehicle, as illustrated in Figure 1, and in this pipe there may be interposed a suitable valve 47 which may be operated by a rod 48. As shown the rod 48 is provided with a suitable handle, whereby the same may be manipulated by the driver of the motor vehicle. The end of the pipe 46 disposed or communicating with the T fitting 44 may carry an expansion nozzle 49 which is adapted to open and permit air under pressure to pass therethrough, said air pressure coming from the cylinder of the engine with which the pipe 46 is connected and which is also adapted to collapse, as illustrated in Figure 5, and permit a free passage of sand through the pipe 43.

In the use of the present apparatus, the storage tank or box 45 should preferably be filled with pulverized material, such as a mixture of sand and other surface friction material, and this material would, of course, gravitate through the pipe 43 and fill the same. In case it is desired to scatter the material the lever 27 may be manipulated to rotate the drum 19 to such a position that the slot 20 will be brought into register with the slot 21 of the drum 18. The slots 20 and 21 are preferably of the width shown and, of course, the inner drum 19 may be rotated in a slow manner and adjusted in order to vary the degree of opening which will occur for discharge of the material within the inner drum and thus to regulate the discharge of material from the last-named drum. At the moment the slots 20 and 21 are brought into registering relation the opening 42' of the drum 19 will come into register with the pipe 43 and the material within the storage tank will gravitate into the drum 19 and thus provide a continuous feed of this material to be scattered forward to the associated drive wheel 12. Also by providing drums 18 and 19 of the length shown and also the hood 14 it is possible to cover a wide enough surface forward to the drive wheel with surface friction material, whereby to prevent side skidding of the vehicle.

Should it be desired to have a more rapid flow of the surface friction material from the drum 19, the valve 47 may be manipulated by the rod 48 in order to cause air pressure to enter the pipe 23 and this air pressure will, of course, force the material from the inner drum 19 and thus more thickly coat the surface over which the drive wheel 12 is passing with the surface friction material and further insure against skidding or slipping of the drive wheel.

While I have shown my invention as applied to one running board of the motor vehicle, it is entirely obvious that another apparatus of the same structure might be applied to the other running board and thus enable the surface friction material to be scattered before both of the drive wheels.

Also while I have shown and described the preferred form of construction, combination and arrangement of parts, I wish it to be understood that I am aware of the fact that the same may be changed by those skilled in the art without departing from the spirit of the appended claims.

I claim:—

1. In a device of the character described, a pair of telescopic drum members, said drums having discharge openings, means whereby surface friction material may be delivered to the interior drum, and means whereby the discharge passages may be brought into register.

2. In a device of the character described, a pair of telescopic drum members, said drums having discharge openings, means whereby surface friction material may be delivered to the interior drum, means whereby discharge passages may be brought into register, and means whereby compressed fluid may be utilized for forcing the surface friction material from the inner drum when said discharge openings are brought into register.

3. An apparatus of the character described comprising a pair of drums one within the other, and said drums having slots adapted to be brought into register, means whereby the inner drum may be rotated for bringing said slots into registration, and means whereby surface friction material may be delivered into the inner drum.

4. A distributing apparatus of the character described comprising a pair of drums, one drum being rotatably positioned within the other drum and said drums having slots adapted to be brought into registration with the rotation of said drums, means whereby finely divided material may be delivered into the inner drum, and means whereby the inner drum may be adjustably rotated.

5. A distributing apparatus of the character described comprising a pair of drums, one drum being rotatably positioned within the other drum and said drums having slots adapted to be brought into registration with the rotation of said drums, means whereby finely divided material may be delivered into the inner drum, and means whereby the inner drum may be adjustably rotated from a remote point.

6. A distributing apparatus of the character described comprising a pair of drums, one drum being rotatably positioned within the other drum and said drums having slots adapted to be brought into registration with the rotation of said drums, means whereby finely divided material may be delivered into the inner drum, a lever carried by the inner drum, and means connected to the free end of said lever whereby said drum may be rotated from a remote point.

7. A distributing apparatus of the character described comprising a pair of drums, one drum being rotatably positioned within the other drum and said drums having slots adapted to be brought into registration with the rotation of said drums, means whereby finely divided material may be delivered into the inner drum, means whereby the inner drum may be adjustably rotated, and yieldable means whereby the innermost drum will be maintained with its slot in non-registering relation to the slot of the outer drum.

8. In an apparatus of the character described, a hood, a door hingedly supported by said hood and adapted to form a closure therefor, said door being adapted to fit within the open end of the hood, a second door or closure plate carried by the first-named door and adapted to be disposed within the walls of the hood when the first-named door is in its closed position.

9. In an apparatus of the character described, a hood terminating at its free edge in an outwardly curved lip, a door hingedly secured to the hood and adapted to form a closure therefor, said door being adapted to fit upon the inner side of said curved lip.

10. In an apparatus of the character described, a hood terminating at its free edge in an outwardly curved lip, a door hingedly secured to the hood and adapted to form a closure therefor, said door being adapted to fit upon the inner side of said curved lip, and packing interposed between the edge of said door and said curved lip.

11. An apparatus of the character described comprising a hood, a pair of drums within the hood, one of said drums being positioned within the hood, means whereby the inner drum may be rotatably supported and said drums having elongated slots adapted to be brought into registration with the rotation of the inner drum, means whereby finely divided material may be delivered to the inner drum, and means whereby the inner drum may be adjustably rotated.

12. An apparatus of the character described comprising a hood, a pair of drums within the hood, one of said drums being positioned within the hood, means whereby the inner drum may be rotatably supported and said drums having elongated slots adapted to be brought into registration with the rotation of the inner drum, means whereby finely divided material may be delivered to the inner drum, means whereby the inner drum may be adjustably rotated, a door for said hood, means whereby said door will be yieldably held in closed position, and means whereby with the rotation of said inner drum the door will be open at the time the slots of said drums are brought into registration.

13. An apparatus of the character described comprising a pair of drums one within the other, means whereby the inner drum may be rotated from a remote point, said drums each having an elongated slot adapted to be brought into registration with the rotation of the inner drum, and means whereby finely divided material may be delivered into said drum when the same is rotated to bring its slot into registration with the slot of the outer drum.

14. An apparatus of the character described comprising a pair of drums one within the other, means whereby the inner drum may be rotated from a remote point, said drums each having an elongated slot adapted to be brought into registration with the rotation of the inner drum, and means whereby finely divided material may be delivered under pressure to the interior of the inner drum when the slots of said drums are brought into registering relation.

PERLEY WISE CARNEY.